(12) United States Patent
Kon (10) Patent No.: US 7,992,848 B2
(45) Date of Patent: Aug. 9, 2011

(54) ACTIVE VIBRATION ISOLATION SUPPORT SYSTEM

(75) Inventor: Hirozumi Kon, Kakuda (JP)

(73) Assignee: Keihin Corporation, Tokyo (JP)

( * ) Notice: Subject to any disclaimer, the term of this patent is extended or adjusted under 35 U.S.C. 154(b) by 1212 days.

(21) Appl. No.: 11/648,896

(22) Filed: Jan. 3, 2007

(65) Prior Publication Data

US 2007/0182077 A1 Aug. 9, 2007

(30) Foreign Application Priority Data

Jan. 10, 2006 (JP) .................................. 2006-002515

(51) Int. Cl.
*F16F 5/00* (2006.01)
*H01F 7/08* (2006.01)

(52) U.S. Cl. ..................... 267/140.14; 267/75; 335/282; 335/299; 336/198

(58) Field of Classification Search ............. 267/140.14, 267/75; 335/282, 299; 336/198
See application file for complete search history.

(56) References Cited

U.S. PATENT DOCUMENTS

| | | | | | |
|---|---|---|---|---|---|
| 2,895,063 | A | * | 7/1959 | Morris | 310/15 |
| 2,945,106 | A | * | 7/1960 | Moyer | 335/121 |
| 3,209,180 | A | * | 9/1965 | Doyle | 310/15 |
| 3,243,745 | A | * | 3/1966 | Glover et al. | 336/83 |
| 4,583,723 | A | * | 4/1986 | Ozawa | 267/140.14 |
| 4,899,996 | A | * | 2/1990 | Maassen et al. | 267/140.14 |
| 6,882,075 | B2 | * | 4/2005 | Do et al. | 310/194 |
| 2005/0200061 | A1 | * | 9/2005 | Nemoto | 267/140.14 |

FOREIGN PATENT DOCUMENTS

| | | | |
|---|---|---|---|
| JP | 63099504 A | * | 4/1988 |
| JP | 2002-198217 A | | 7/2002 |
| JP | 2004-289939 A | | 10/2004 |
| JP | 2004-291737 A | | 10/2004 |
| JP | 2004-297871 A | | 10/2004 |
| JP | 2007-057074 A | | 3/2007 |
| WO | WO 03/021754 A1 | | 3/2003 |

* cited by examiner

*Primary Examiner* — Bradley T King
*Assistant Examiner* — Mahbubur Rashid
(74) *Attorney, Agent, or Firm* — Arent Fox LLP

(57) ABSTRACT

In an active vibration isolation support system in which internal pressures of fluid chambers whose volumes are changed by a load applied from outside are controlled by an actuator that reciprocatingly vibrates a movable core on an axis by energizing a coil cylindrically wound around an outer periphery of a fixed core, an end surface of the coil on the fluid chambers side is inclined so that a radially outer side of the end surface is close to the fluid chambers with respect to the axis. Therefore, the output can be increased by increasing the number of windings of the coil without increasing the dimension of the active vibration isolation support system in the direction of the axis. Also, if the number of windings of the coil is made the same as that of the conventional system, the outer diameter of the coil can be made smaller than that of the conventional system accordingly to reduce the entire length of wire of the coil, thereby reducing the resistance and inductance to improve the electrical current response.

2 Claims, 7 Drawing Sheets

ACTIVE VIBRATION ISOLATION SUPPORT SYSTEM

RELATED APPLICATION DATA

The present invention is based upon Japanese priority application No. 2006-002515, which is hereby incorporated in its entirety herein by reference.

BACKGROUND OF THE INVENTION

1. Field of the Invention

The present invention relates to an active vibration isolation support system comprising: an actuator for reciprocatingly vibrating a movable core on an axis by energizing a coil cylindrically wound around an outer periphery of a fixed core; and a fluid chamber which is arranged on the axis of the actuator, whose volume is changed by a load applied from outside, and whose internal pressure is controlled by being connected to the movable core.

2. Description of the Related Art

Such an active vibration isolation support system is publicly known by Japanese Patent Application Laid-open No. 2004-291737. In this active vibration isolation support system, a coil of an actuator is wound into a simple cylindrical shape having an axis as its center, and both an upper surface of the coil on a side of a fluid chamber and a lower surface of the coil on a side opposite from the fluid chamber are flat surfaces perpendicular to the axis.

In order to allow the actuator of the active vibration isolation support system to generate a sufficient output, the number of windings of coil is required to be a predetermined value or more. However, if the number of windings is increased by extending the axial dimension of the coil while the coil is kept in a simple cylindrical form, there arises a problem that the axial dimension of the active vibration isolation support system increases. Also, if the number of windings is increased by increasing the outer diameter of the coil while the coil is kept in a simple cylindrical form, there arises a problem that the entire length of a wire of the coil increases, thereby increasing the resistance and inductance to lower the electrical current response.

SUMMARY OF THE INVENTION

The present invention has been achieved in view of the above-mentioned circumstances, and has an object to secure the output and the electrical current response of an actuator of an active vibration isolation support system without increasing the dimension of the system.

In order to achieve the above subject, according to a first feature of the present invention, there is provided an active vibration isolation support system comprising: an actuator for reciprocatingly vibrating a movable core on an axis by energizing a coil cylindrically wound around an outer periphery of a fixed core; and a fluid chamber which is arranged on the axis of the actuator, whose volume is changed by a load applied from outside, and whose internal pressure is controlled by being connected to the movable core, wherein an end surface of the coil on the fluid chamber side is inclined so that a radially outer side of the end surface is close to the fluid chamber with respect to the axis.

According to a second feature of the present invention, in addition to the first feature, the system has a bobbin around which the coil is wound, and a step portion extending in a circumferential direction with respect to the axis is formed on an inner surface of the bobbin contacting the inclined end surface of the coil.

According to a third feature of the present invention, in addition to the first feature, the coil is a bobbin less coil, and a step portion extending in a circumferential direction with respect to the axis L is formed on an inner surface of a plate contacting the inclined end surface of the coil.

First and second fluid chambers 24 and 25 of embodiments correspond to a fluid chamber of the present invention, and an upper plate 72 of the embodiments corresponds to a plate of the present invention.

With the arrangement of the first feature, in the active vibration isolation support system in which the internal pressure of the fluid chamber whose volume is changed by a load applied from outside is controlled by the actuator that reciprocatingly vibrates the movable core on the axis by energizing the coil cylindrically wound around the outer periphery of the fixed core, the end surface of the coil on the fluid chamber side is inclined so that the radially outer side of the end surface is close to the fluid chamber with respect to the axis. Therefore, the number of windings of the coil can be increased to increase the output without increasing the dimension of the active vibration isolation support system in the direction of the axis. Also, if the number of windings of the coil is made the same as that of the conventional system, the outer diameter of the coil can be made smaller than that of the conventional system accordingly to reduce the entire length of the wire of the coil, thereby reducing the resistance and inductance to improve the electrical current response.

With the arrangement of the second feature, the step portion extending in the circumferential direction with respect to the axis is formed on the inner surface of the bobbin contacting the inclined end surface of the coil. Therefore, when the wire of the coil is wound, the wire is caught by the step portion, so that the collapse of winding is difficult to occur, thereby easily reliably perform winding.

With the arrangement of the third feature, the step portion extending in the circumferential direction with respect to the axis is formed on the inner surface of the plate contacting the inclined end surface of the bobbin less coil. Therefore, when the wire of the coil is wound, the wire is caught by the step portions, so that the collapse of winding is difficult to occur, thereby easily reliably perform winding.

The above-mentioned object, other objects, characteristics, and advantages of the present invention will become apparent from preferred embodiments, which will be described in detail below by reference to the attached drawings.

DESCRIPTION OF THE PREFERRED EMBODIMENTS

Figure 1:
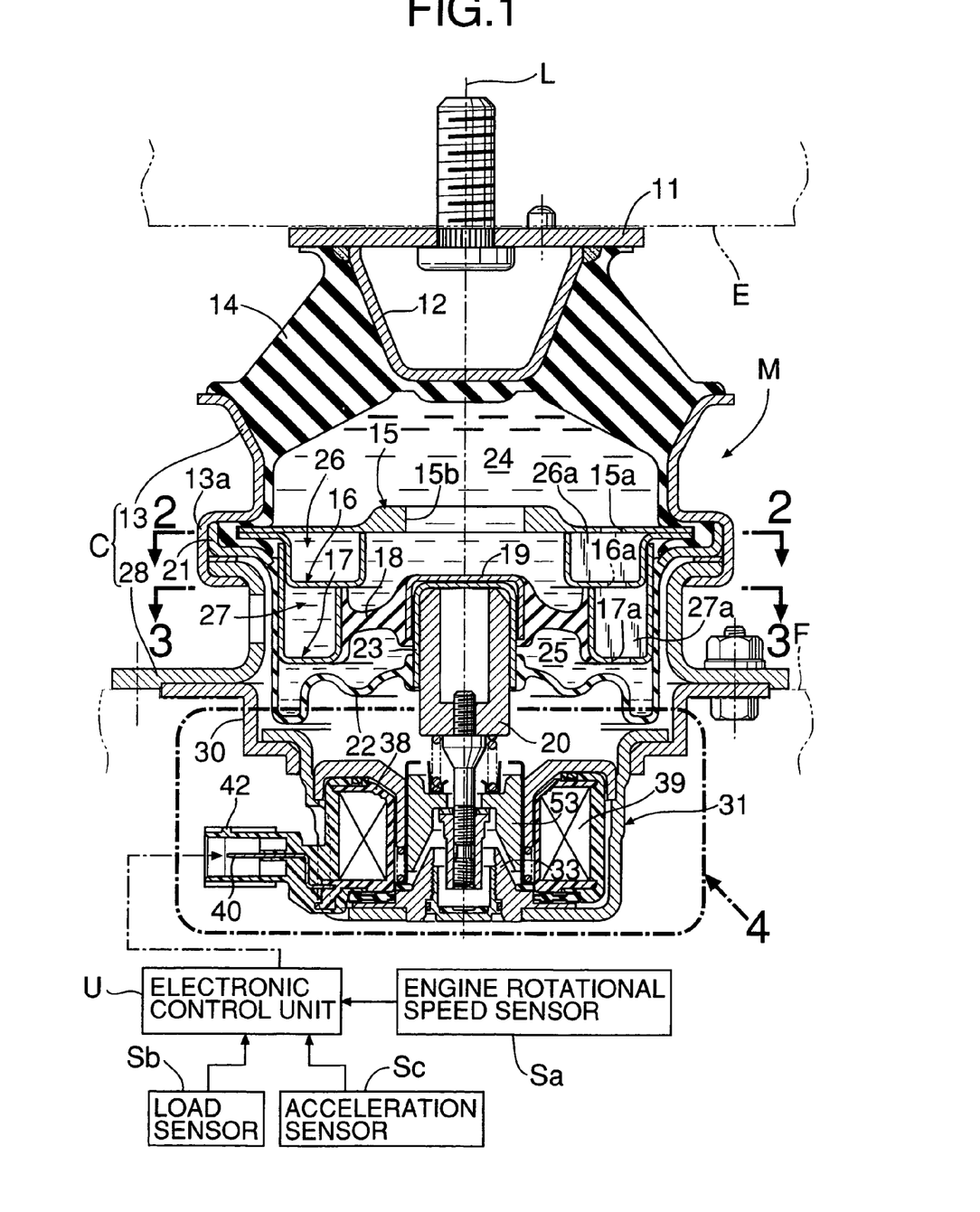
FIG. 1 is a longitudinal sectional view of an active vibration isolation support system according to a first embodiment.

In FIG. 1 first, an active vibration isolation support system M comprising an electromagnetic actuator 31 according to the present invention is provided between an engine E and a vehicle body frame F of an automobile in order to elastically support them.

The active vibration isolation support system M has a structure that is substantially symmetrical with respect to an axis L. The system M includes: a plate-shaped mounting bracket 11 that is joined to the engine E; an inner tube 12 that is welded to the mounting bracket 11; an outer tube 13 that is placed coaxially on an outer periphery of the inner tube 12; and a first elastic body 14 made of thick rubber and the like and bonded by vulcanization bonding to opposed conical surfaces of the inner tube 12 and the outer tube 13. Disposed below the first elastic body are a first orifice-forming member 15, a second orifice-forming member 16 and a third orifice-forming member 17 which are vertically arranged ad integral with one another.

The first orifice-forming member 15 is disc-shaped and has an aperture 15*b* in its center. The annular second orifice-forming member 16 made of rubber has a dipper-shaped section open at the top, and bonded by vulcanization bonding integrally to the first orifice-forming member 15 so that its opened top face is closed by the first orifice-forming member 15. Also, the third orifice-forming member 17 has a dipper-shaped section open at the top, and bonded by vulcanization bonding integrally to the second orifice-forming member 16 so that its opened top face is closed by the second orifice-forming member 16. The outer peripheries of the first orifice-forming member 15 and the second orifice-forming member 16 are integrally superimposed and fixed to an annular crimping fixing part 13*a* provided in a lower part of the outer tube 13.

The outer periphery of an annular second elastic body 18 made of rubber is fixed by vulcanization bonding to the inner periphery of the third orifice-forming member 17. A first cap member 19 is fixed by vulcanization bonding to the inner periphery of the second elastic body 18 such that the first cap member 19 is disposed on and axis L with its bottom face opened. A second cap member 23, fixed by vulcanization bonding to the inner periphery of the diaphragm 22, is fixed onto the movable member 20 bypress fitting. A second cap member 23 and a movable member 20 are sequentially fixed by press fitting to the first cap member 19. The lower end of the second cap member 23 protrudes below the first cap member 19. The inner peripheral end of a diaphragm 22 disposed below the second elastic body 18 is fixed by vulcanization bonding to the outer peripheral surface of the protruding end of the second cap member 23. A ring member 21 is fixed by vulcanization bonding to the outer periphery of the diaphragm 22. The ring member 21 is fixed to crimping fixing part 13*a*, together with the outer peripheries of the first and second orifice-forming members 15 and 16. The movable member 20 is vertically movable together with the first and second cap members 19 and 23 by bending of the second elastic body 18 and the diaphragm 22.

A first liquid chamber 24, which is charged with a liquid, is thus defined between the first elastic body 14 and the second elastic body 18. Also, a second liquid chamber 25, which is charged with a liquid, is thus defined between the second elastic body 18 and the diaphragm 22. The first liquid chamber 24 and the second liquid chamber 25 communicates with each other via an upper orifice 26 and a lower orifice 27 which are formed by the first to third orifice-forming members 15, 16 and 17.

Figure 2:
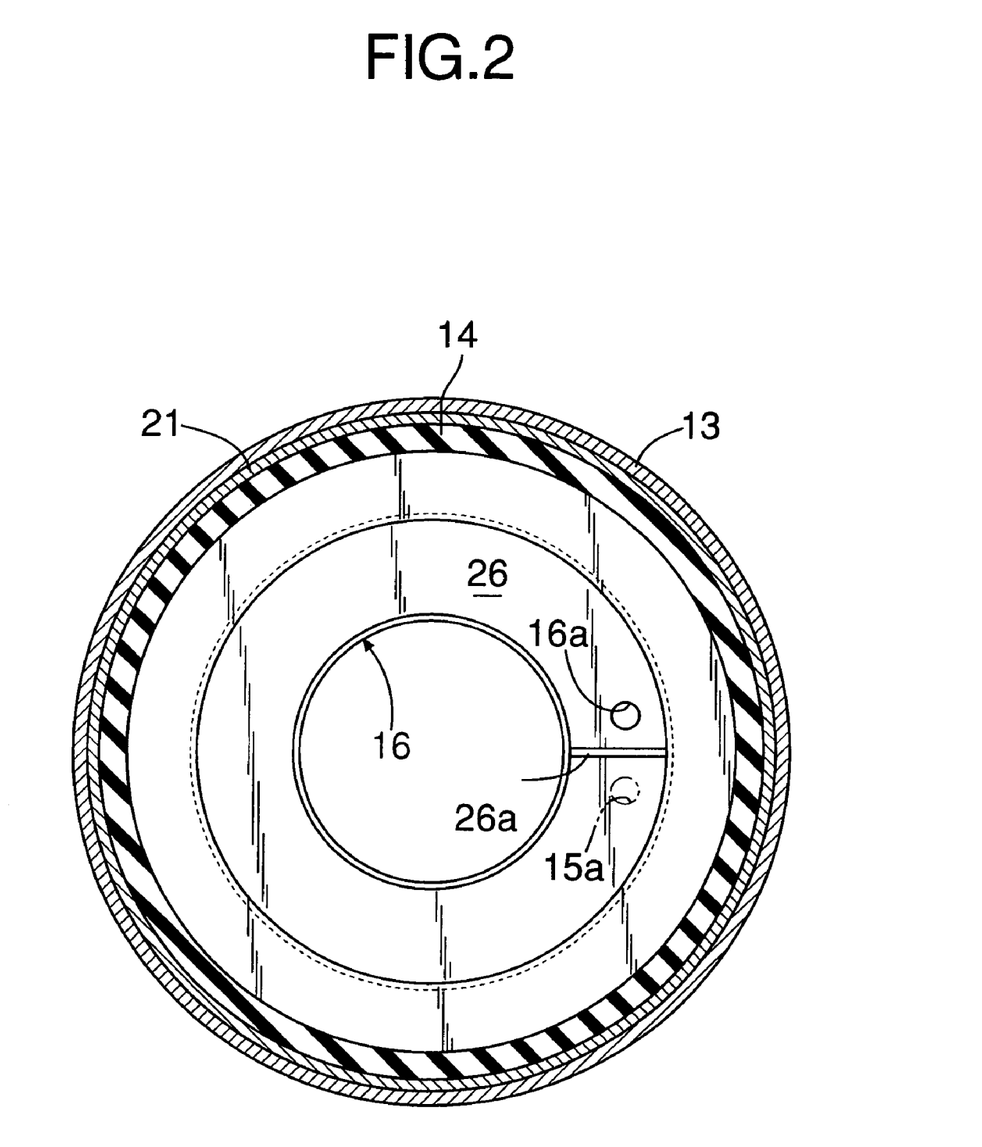
FIG. 2 is a sectional view taken along the line 2-2 of FIG. 1.

The upper orifice 26 is an annular passage formed between the first orifice-forming member 15 and the second orifice-forming member 16 and over a slightly less than one round (see FIG. 2) A partition wall 26*a* forming the opposite end walls of the upper orifice 26 is welded between the first and second orifice-forming members 15 and 16. The upper orifice 26 communicates with the first liquid chamber 24 on one side of the partition wall 26*a* via a communicating hole 15*a* of the first orifice-forming member 15, and communicates with the second liquid chamber 25 on the other side of the partition wall 26*a* via a communicating hole 16*a* of the second orifice-forming member 16.

Figure 3:
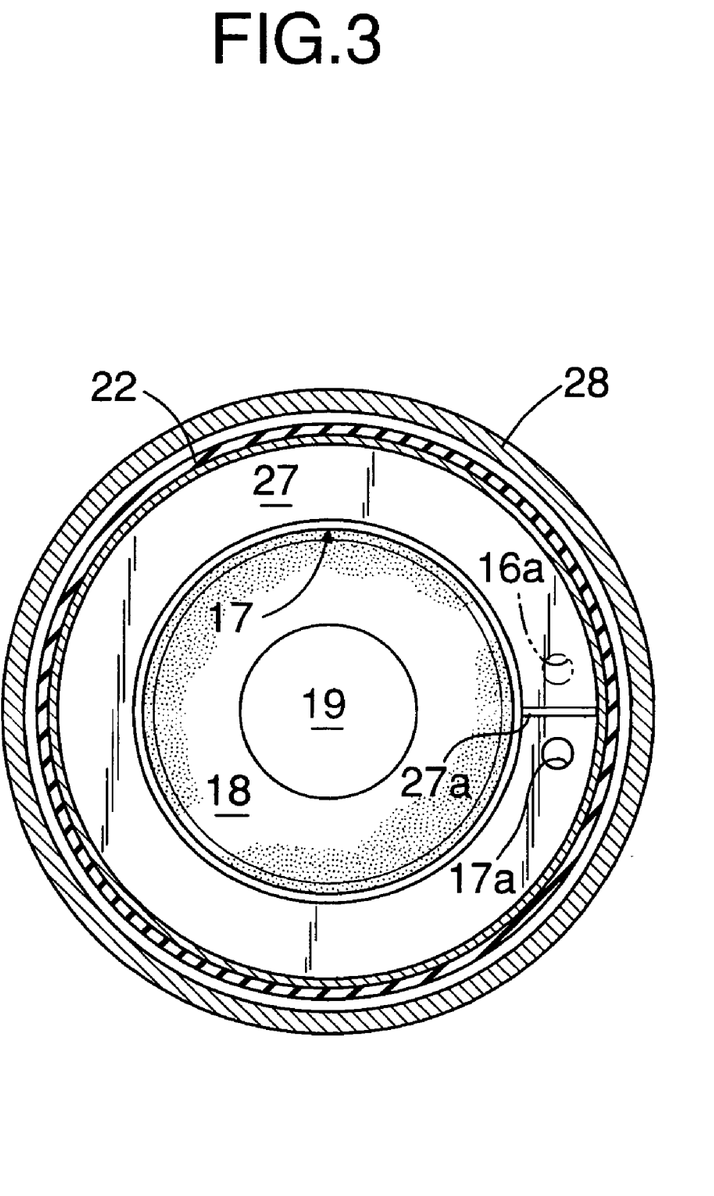
FIG. 3 is a sectional view taken along the line 3-3 of FIG. 1.

The lower orifice 27 is an annular passage formed between the second orifice-forming member 16 and the third orifice-forming member 17 and over a slightly less than one round (see FIG. 3). A partition wall 27*a* forming the opposite end walls of the lower orifice 27 is welded between the second and third orifice-forming members 16 and 17. The lower orifice 27 communicates with the second liquid chamber 25 on one side of the partition wall 27*a* via the communicating hole 16*a*, and communicates with the second liquid chamber 25 on the other side of the partition wall 27*a* via a communicating hole 17*a* of the third orifice-forming member 17. Therefore, the upper orifice 26 and the lower orifice 27 connected in series to each other provide a communication between the first liquid chamber 24 and the second liquid chamber 25.

A cylindrical mounting bracket 28 is also fixed to the crimping fixing part 13*a*. The active vibration isolation support system is fixed to the vehicle body frame F by fixing the mounting bracket 28 to the vehicle body frame F. The cylindrical mounting bracket 28 and the outer tube 13 constitute a support casing C.

An actuator support member 30 is secured to the cylindrical mounting bracket 28, and supports the electromagnetic actuator 31 for driving the movable member 20.

Figure 4:
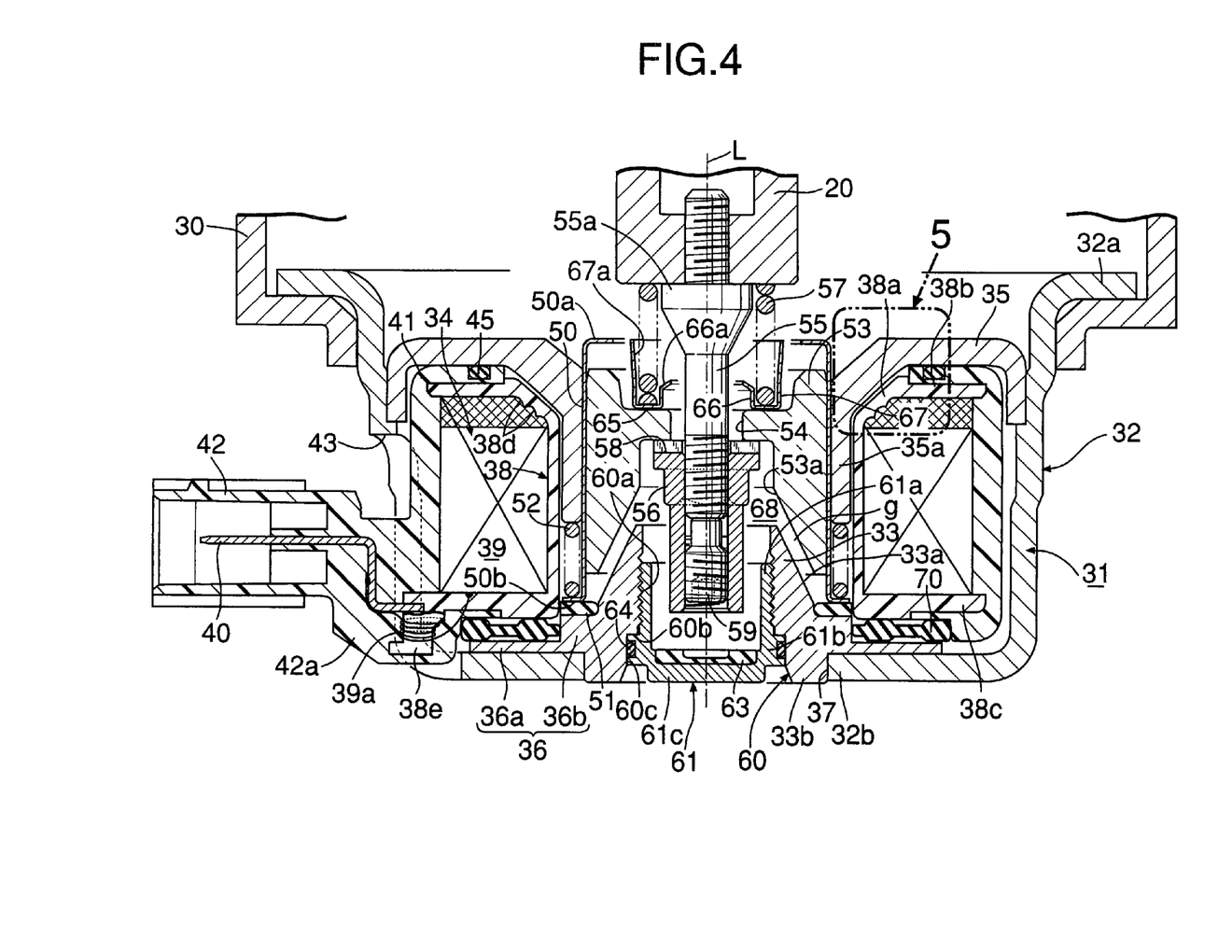
FIG. 4 is an enlarged view of portion 4 of FIG. 1.

In FIG. 4, the actuator 31 has a bottomed cylindrical housing 32 made of magnetic material with its upper surface opened. A flange 32*a* formed at the upper end of the housing 32 is fixed to the actuator support member 30. The housing 32 is magnetic material, within which there are sequentially disposed a fixed core 33, a coil assembly 34 and a yoke 35. The fixed core 33 has an attraction surface 33*a* in an upper part thereof, a positioning shaft 33*b* protruding on an underside thereof, and a stepped collar-shaped flange 36 formed at the outer periphery. The flange 36 is brought into close contact with the bottom wall 32*b* of the housing 32 so that the positioning shaft 33*b* is pressed into the positioning hole 37 in the bottom wall 32*b*. Thus, the fixed core 33 is fixed to the housing 32.

Figure 5:
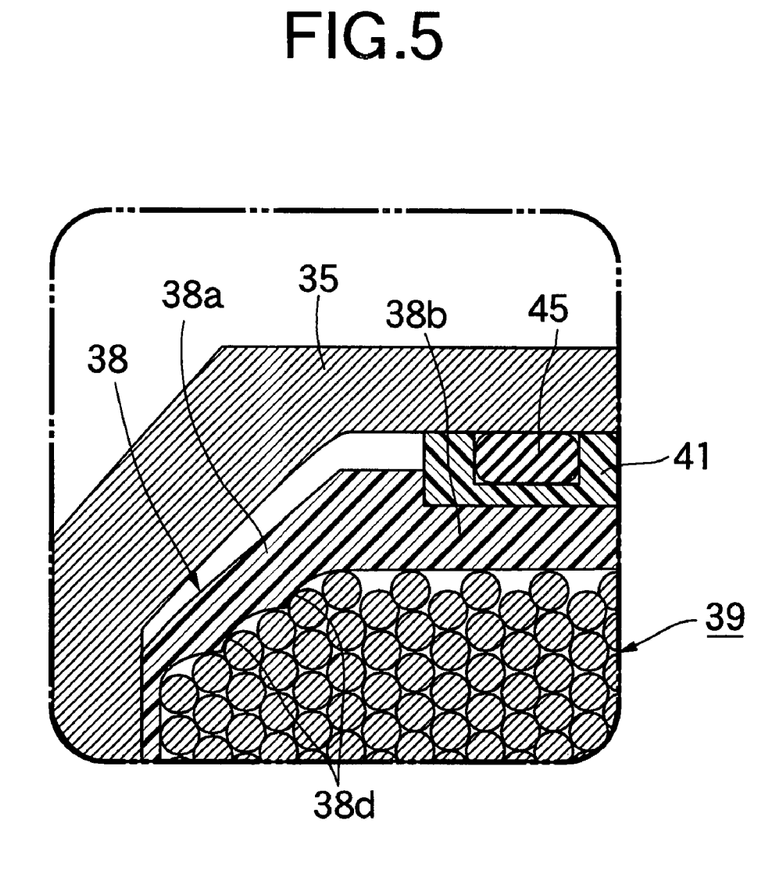
FIG. 5 is an enlarged view of portion 5 of FIG. 4.

The coil assembly 34 comprises a bobbin 38 made of synthetic resin and arranged at the outer periphery of the fixed core 33, and a coil 39 would around this bobbin 38. The bobbin 38 comprises upper flanges 38*a* and 38*b* on its upper side, and a lower flange 38*c* on its lower side. The upper outer flange 38*b* and the lower flange 38*c*, which are positioned on a radially outer side, extend to be orthogonal to the axis L. The upper inner flange 38*a*, which is positioned on a radially inner side, extends obliquely upward toward the first and second liquid chambers 24 and 25. As shown in FIG. 5, stair-shaped step portions 38*d* radially extending from the axis L as a center are formed on an inner surface of the upper inner flange 38*a* (surface opposed to the coil 39). Each stair-shaped step portion 38*d* may be formed to define an arcuate cross section, as shown in FIG. 5.

A small strut 38*a* protruding downward is projectingly provided on the outer periphery of the lower flange of the bobbin 38. During molding of this small strut 38*a*, a proximal end portion of the coupler terminal 40 is insert-connected to the small strut 38*a*. Wound around the small strut 38*a* is an outgoing line 39*a* of the coil 39, the tip end of which is connected to the coupler terminal 40 by means of soldering, electric welding or the like.

After the outgoing line 39*a* is connected to the coupler terminal 40, in order to seal the coil 39 to the bobbin 38, a tube-shaped coil cover 41 which comes into close contact from the upper and lower end surfaces of the bobbin 38 to the outer peripheral surface of the coil 39 is injection-molded using synthetic resin. On that occasion, on this coil cover 41, there are integrally formed a coupler 42 for holding the coupler terminal 40 to protrude outward in the radial direction of the coil cover 41, and a protruded portion 42*a* for enveloping the outgoing line 39*a* from the small strut 38*a* to protrude on the lower end surface of the coil cover 41. This coupler 42 is arranged so as to expose outside the housing 32 through an aperture 43 provided from the bottom wall 32*b* of the housing 32 to the peripheral wall. The protruded portion 42*a* is arranged within the aperture 43 so as to be adjacent to the bottom wall 32*b* of the housing 32.

On the upper end surface of the coil assembly 34, particularly on the upper end surface of the coil cover 41, there is mounted an annular sealing member 45. Also, between the lower end surface of the coil assembly 34 and a thin outer peripheral portion 36*a* of the flange 36, there is interposed a sealing member 70.

The yoke 35 is fixed to the inner peripheral surface of the housing 32 by press-fitting in order to press and hold the coil assembly 34 toward the flange 36. With this fixing, the sealing members 45 and 70 are compressed, whereby the coil assembly 34 is elastically supported without looseness between the yoke 35 and the flange 36. With this arrangement, the space accommodating the coil 39 and the movable core 53 serves as a sealed space 68, thereby improving the water proof property.

On the inner peripheral surface of a cylindrical portion 35*a* to be arranged on the inner periphery of the bobbin 38 of the yoke 35, a thin tube-shaped bearing member 50 is slidably fitted. At the upper end of this bearing member 50, an inwardly-facing flange 50*a* pointing inwardly in the radial direction is integrally formed, while at the lower end thereof, an outwardly-facing flange 50*b* pointing outwardly in the radial direction is integrally formed. The outwardly-facing flange 50*b* is superimposed on the thick inner peripheral portion 36*b* of the flange 36 through the annular elastic plate 51, and between this outwardly-facing flange 50*b* and the fixed core 33, a set spring 52 made of coil spring is provided in a compressed state, whereby the bearing member 50 is elastically held on the flange 36 for vibration isolation.

Also, when the movable core 53 descends on the fixed core 33 side, the elastic plate 51 also serves as a descending stopper for the movable core 53, which receives the lower end of the movable core 53 as a cushion in order to avoid collision between both cores 33, 53 and defines a descending limit thereof.

Slidably fitted to the bearing member 50 is the movable core 53 having an attraction surface 53*a* opposed to an attraction surface 33*a* of the fixed core 33 through the air gap g. The upper end of a connecting bolt 55 which loosely penetrates a comparatively large-diameter through-hole 54 opened at the central part of this movable core 53 is threadably attached to the movable member 20. At the lower end portion of the connecting bolt 55, an adjustment nut 56 of the movable core 53 for supporting the lower end surface around the through-hole 54 is threadedly engaged. On that occasion, the set spring 57 for holding the movable core 53 at a supporting position by the adjustment nut 56 is provided between the movable member 20 and the movable core 53 in a compressed state. Thus, the movable core 53 is elastically interposed between the set spring 57 and an adjustment nut 56 threadedly engaged with the connecting bolt 55 made integral with the movable member 20. On the upper end surface of the adjustment nut 56 held in press contact with the movable core 53, a radial ventilating groove 58 communicating with the through-hole 54 is formed in such a manner that when the movable core is moving up and down, air can be smoothly circulated in space above and below it.

Thus, if a threaded position of the adjustment nut 56 with the connecting bolt 55 is advanced and retreated, up and down positions of the movable core 53, that is, the air gap g between attraction surfaces 33*a* and 53*a* of the movable core 53 and the fixed core 33 can be adjusted by corporation with the set spring 57. An adjustment position of the adjustment nut 56 is threadedly engaged with and tightly fastened from below by the adjustment nut 56, and is fixed by a lock screw 59.

An adjustment operating hole 60 for allowing the adjustment nut 56 to go in and out is provided at the central portion of the fixed core 33 so that the lock screw 59 and the adjustment nut 56 can be operated by means of a tool inserted into the adjustment operating hole 60. The adjustment operating hole 60 comprises a threaded hole 60*a*, and a fitting hole 60*c* which has a diameter larger than that of the threaded hole 60*a* and which continues through an annular shoulder portion 60*b* to the lower end of the threaded hole 60*a*. On the other hand, a peg body 61 closing the adjustment operating hole 60 has a bottomed cylindrical shape with its upper end opened. The peg body 61 has a threaded tube 61*a* to be threadedly engaged with the threaded hole 60*a* while receiving the adjustment nut 56, a collar portion 61*b* to be fitted into a fitting hole 60*c*, and a bottom portion 61*c*. A sealing member 64 is mounted on the outer periphery of the collar portion 61*b* to come into close contact with the inner peripheral surface of the fitting hole 60*c*. A polygonal tool engaging projection 62 is formed on the undersurface of the bottom portion 61*c*.

Until the collar portion 61*b* fitted in the fitting hole 60*c* abuts against the shoulder portion 60*b*, the threaded tube 61*a* is threadedly engaged with and tightly fastened to the threaded hole 60*a*, whereby the adjustment operating hole 60 can be watertightly closed by the peg body 61.

The elastic plate 63 is bonded on the upper surface of the bottom portion 61*c* of this peg body 61. The bottom portion 61*c* shock-absorbingly receives the lower end of the adjustment nut 56 through the elastic plate 63 to define a descending limit of the movable member 20. However, when the adjustment nut 56 abuts against the bottom portion 61*c* of the peg body 61, the movable member 20 further descends while the movable member 20 compresses the set spring 57 after the movable core 53 reaches the above-described descending limit by descending of the movable member 20.

Within the bearing member 50, each of attraction surfaces 33*a*, 53*a* of the fixed core 33 and the movable core 53 which oppose to each other is formed in a conical surface so as to define a conical tube-shaped air gap g therebetween, and is arranged so that the attraction surface 53*a* of the movable core 53 surrounds the attraction surface 33*a* of the fixed core 33. Therefore, even in the fixed core 33 and the movable core 53 within the bearing member 50, each having a comparatively small diameter within the bearing member 50, it is possible to acquire a comparatively strong attraction force and a comparatively long stroke of the movable core 53.

Moreover, since the attraction surface 53*a* of the movable core 53 is formed on the inner peripheral surface side of the core 53, a supporting span of the movable core 53 by the bearing member 50 can be secured sufficiently long irrespective of the attraction surface 53*a*, and stable ascent and descent of the movable core 53 can be ensured. In this case, it is effective in acquiring further stable, smooth ascent and descent of the movable core 53 that the outer peripheral surface of the movable core 53 is formed with a low friction material layer made of Teflon (registered trademark) or the like.

The set spring 57 is made of coil spring, and by fitting it to a large-diameter portion 55a at the base of the connecting bolt 55, the set spring 57 is arranged concentrically with the connecting bolt 55. Also, between this set spring 57 and the movable core 53, there is interposed an annular spring seat 65 made of steel plate in order to prevent the movable core 53 from wearing. This spring seat 65 has inner and outer concentric positioning tubular portions 66, 67 which rise along the inner peripheral surface and outer peripheral surface of the set spring 57 from the inner peripheral edge portion and outer peripheral edge portion. The outside positioning tubular portion 67 is formed longer than the inside positioning tubular portion 66. In order to facilitate insertion of the set spring 57 between these positioning tubular portions 66, 67, there are formed funnel portions 66a, 67a at the upper end portions of the positioning tubular portions 66, 67. Also, on at least one of abutted surfaces in which this spring seat 65 and the movable core 53 oppose to each other, a low friction material layer of Teflon (registered trademark) or the like is formed to thereby make sliding property of the spring seat 65 to the movable core 53 excellent.

Referring again to FIG. 1, an electronic control unit U is connected to a coil 39 of the actuator 31 through a coupler 42. Inputted to the electronic control unit U are detection signals of a rotation speed sensor Sa for detecting engine rotation speed, a load sensor Sb for detecting a load to be inputted into the active type vibration isolating support system M, and an acceleration sensor Sc for detecting acceleration that is exerted on an engine E.

Next, the description will be made of an operation of this embodiment.

When the actuator 31 of the active type vibration isolating support system M is in a non-operating state, although the first and second liquid chambers 24, 25 which communicate with each other through the upper and lower orifices 26, 27 are kept at the same pressure, since a pressure receiving area in the fist liquid chamber 24 of the first cap member 19 connected to the movable member 20 is larger than a pressure receiving area in the second liquid chamber 25, a downward load obtained by multiplying the difference in area by pressure in the first liquid chamber 24 is exerted on the movable member 20. When a balance is established between the load and a repulsion force of the second elastic body 18 against it, the movable member 20 comes to a halt, forming a predetermined initial air gap g between attraction surfaces 33a, 53a of the fixed core 33 and the movable core 53.

When shake vibration of low frequency occurs in the engine E during running of an automobile, the first elastic body 14 is deformed because of a load inputted from the engine E to change capacity of the first liquid chamber 24. Then, the liquid goes and comes between the first and second liquid chambers 24, 25 which communicate with each other through the upper and lower orifices 26, 27. When the capacity of the first liquid chamber 24 is enlarged and reduced, the capacity of the second liquid chamber 25 is reduced and enlarged accordingly, and the variations in capacity of this second liquid chamber 25 are absorbed by elastic deformation of a diaphragm 22. At this time, since shapes and dimensions of the upper and lower orifices 26, 27 and spring constant of the first elastic body 14 have been set so as to show high spring constant and a high attenuation force in a frequency domain of the shake vibration, vibration to be transmitted from the engine E to the body frame F can be effectively reduced.

In such a shake vibration domain of low frequency of the engine E, the actuator 31 is kept in a non-operating state.

When vibration of a frequency higher than the shake vibration, that is, idle vibration or booming noise vibration that occurs during idling of the engine E occurs, liquid within the upper and lower orifices 26, 27 which connect the first and second liquid chambers 24, 25 enters a stick state, so that the engine E becomes unable to exhibit a vibration isolating function. In such a case, the actuator 31 is driven to exhibit the vibration isolating function.

In other words, the electronic control unit U controls energizing to a coil 39 of the actuator 31 on the basis of a detection signal inputted from the engine rotation speed sensor Sa, the load sensor Sb, the acceleration sensor Sc and the like. Specifically, when the engine E leans is displaced downward because of vibration and the capacity of the first liquid chamber 24 is reduced due to the downward deformation of the first elastic body 14 to raise the liquid pressure, the coil 39 is energized to attract the movable core 53 on the fixed core 33 side. As a result, the movable core 53 descends while deforming the second elastic body 18 so that the capacity of the first liquid chamber 24 is enlarged, thereby suppressing the rise in pressure in the chamber 24. Eventually, the active type vibration isolating support system M generates an active supporting force for preventing the downward load from the engine E to the body frame F from being transmitted.

On the other hand, when the engine E is displaced upward and the capacity of the first liquid chamber 24 is enlarged to reduce the pressure in the chamber 24, the coil 39 is demagnetized to release the movable core 53. As a result, the movable core 53 rises due to the repulsion force of the second elastic body 18 so that the capacity of the first liquid chamber 24 is reduced, thereby suppressing the drop in pressure in the chamber 24. Eventually, the active type vibration isolating support system M generates an active supporting force for preventing the upward load from the engine E to the body frame F from being transmitted.

During such an operation, when the pressure in the fist liquid chamber 24 is abruptly increased to apply the excessive downward load to the movable member 20 due to an excessive increase in the downward load from the engine E to the first elastic body 14, the movable member 20 first descends the movable core 53 to its descent limit, that is, until the lower end surface of the core 53 is abutted against the elastic plate 51 on the thick inner peripheral portion 36b of the flange 36. Thereafter, the set spring 57 is compressed and becomes deformed so that the adjustment nut 56 is moved away from the underside of the movable core 53, whereby the movable member 20 is allowed to further move toward the fixed core 33 side. Accordingly, by causing the set spring 57 to absorb the excessive load of the movable member 20, it is possible to prevent mutual contact between the fixed core 33 and the movable core 53, and the excessive load acting on the movable core 53 and the elastic plate 51, and to secure their durability.

Thus, if the movable member 20 descends by a predetermined amount after the movable core 53 reaches the descent limit, the adjustment nut 56 abuts against a bottom portion 61c of the peg body 61 fixed to the fixed core 33 through the elastic plate 63 to restrict any excessive increase in the load on the set spring 57, thereby preventing any increase in over-load on the fixed core 33 and the movable core 53.

Figure 6:
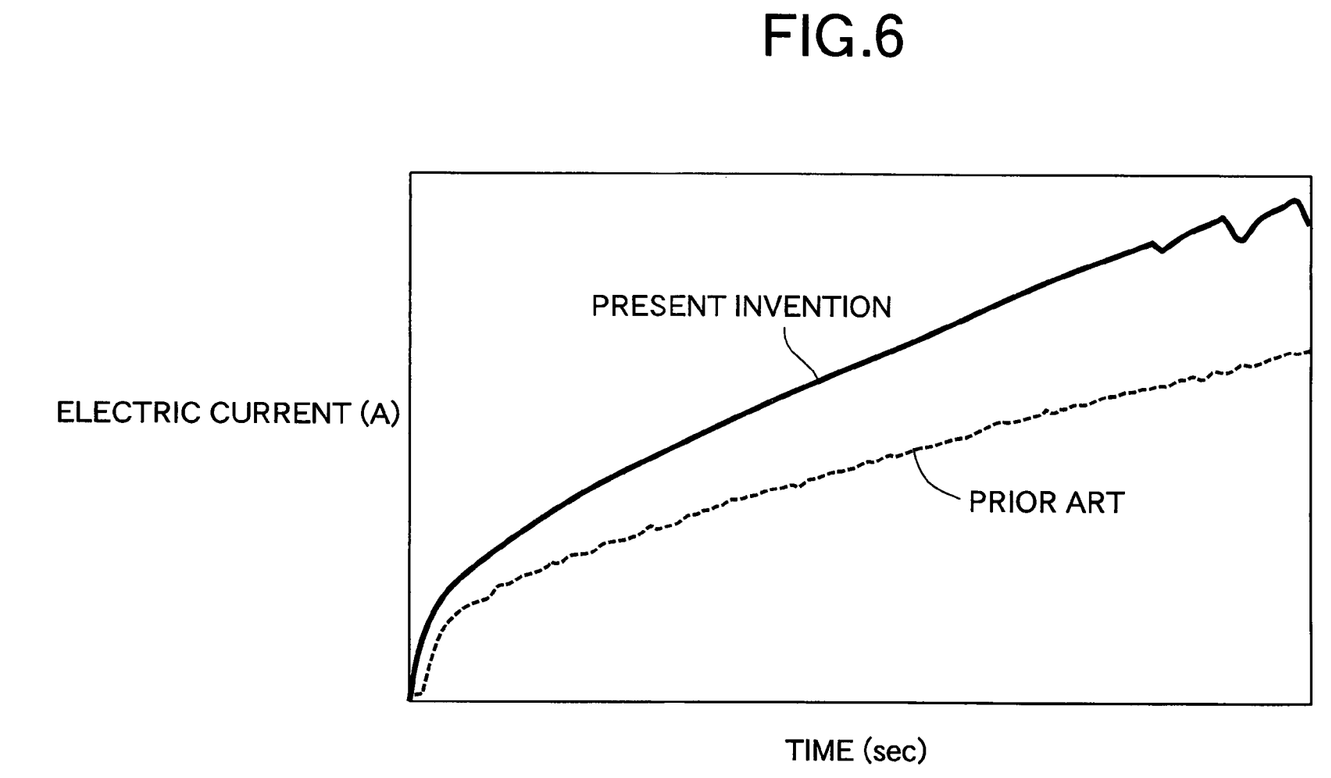
FIG. 6 is a graph for explaining the effect of the present invention.

Since the upper inner flange 38a of the bobbin 38 slants obliquely upward and extends in the direction away from the lower flange 38c, the coil 39 of this embodiment has a cross-sectional area increased by the hatched portion in FIG. 4 as compared with the coil described in Japanese Patent Application Laid-open No. 2004-291737, thereby increasing the number of windings of the coil 39. If the upper flange is moved upward in order to increase the number of windings of the coil while keeping the shape perpendicular to the axis L, the dimension of the active vibration isolation support system M accordingly increases in the direction of the axis L. However, as in this embodiment, by inclining the upper flanges 38a and 38b upward from the radially inside to outside as a whole, a dead space in the inner peripheral portion of the flange 32a of the housing 32 can be effectively utilized, so that the number of windings of the coil 39 can be increased without increasing the dimension of the active vibration isolation support system M in the direction of the axis L. Also, if the number of windings of the coil 39 is made the same as that of the conventional system, the outer diameter of the coil 39 can be made smaller than that of the conventional system accordingly to reduce the entire length of wire of the coil 39, thereby reducing the resistance and inductance to improve the electrical current response (refer to FIG. 6).

Also, since stair-shaped step portions 38d are formed on the inner surface of the upper inner flange 38a of the bobbin 38, when the wire of the coil 39 is wound, the wire is caught by the step portions 38d, so that the collapse of winding is difficult to occur, thereby easily reliably performing winding.

Figure 7:
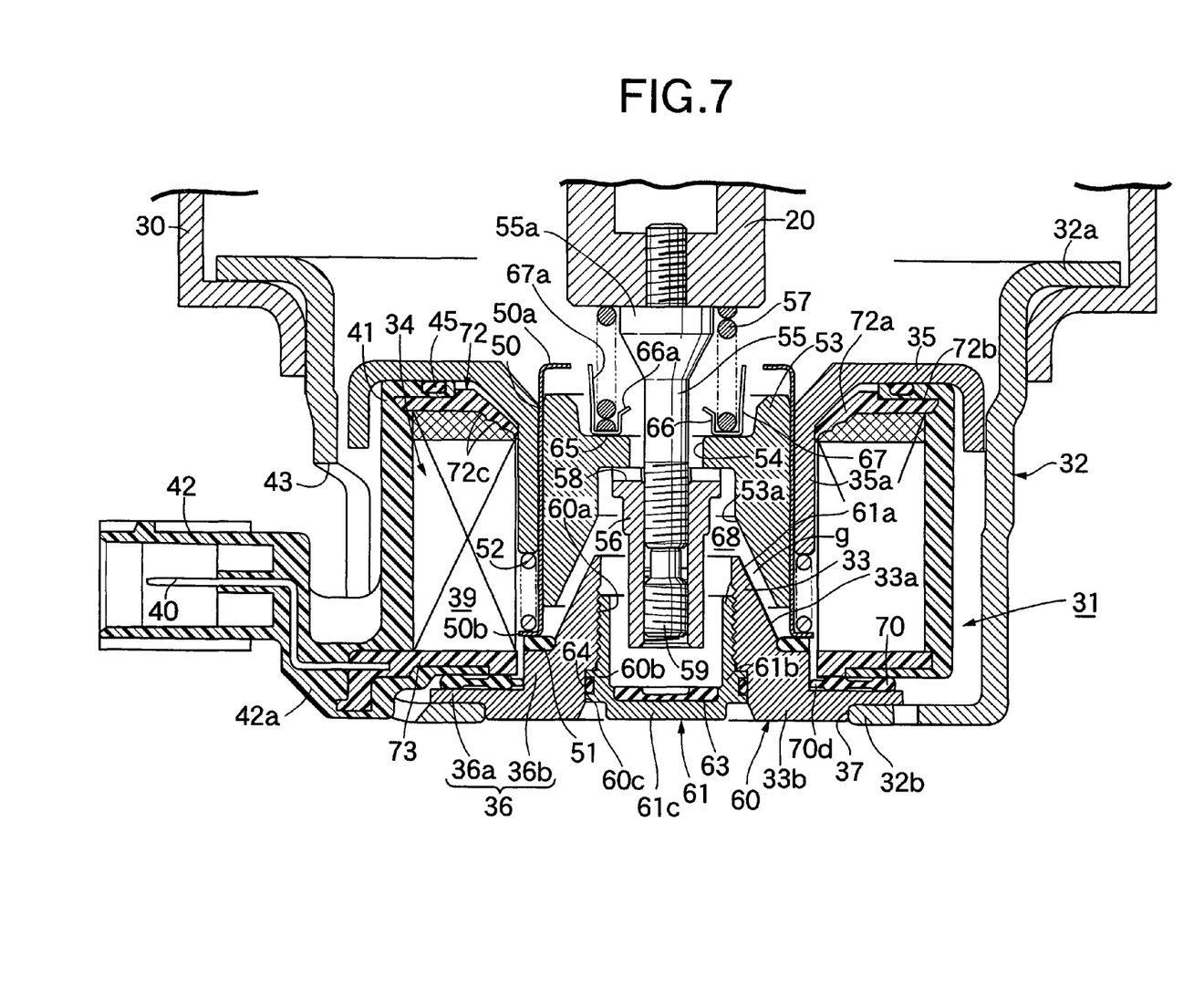
FIG. 7 is a view corresponding to FIG. 4, according to a second embodiment.

Next, the second embodiment of the present invention will be described with reference to FIG. 7. In this second embodiment, components corresponding to those in the first embodiment are denoted by the same reference numerals and symbols in the first embodiment, and the overlapping description thereof is omitted.

The coil 39 of the first embodiment comprises the bobbin 38, but the coil 39 of the second embodiment is a bobbin less coil comprising no bobbin. The structure of the second embodiment is substantially the same as that of the first embodiment, except that the coil 39 of the second embodiment has no bobbin. The upper and lower surfaces of the coil 39 wound in a cylindrical shape are covered with an upper plate 72 and a lower plate 73, respectively. The coil cover 41 is molded to cover the upper surface of the outer periphery of the upper plate 72 and the lower surface of the outer periphery of the lower plate 73.

The upper plate 72 has an inner portion 72a obliquely extending upward in the direction away from the axis L, and an outer portion 72b extending in the direction perpendicular to the axis L. formed on the inner surface (the surface facing the coil 39) of the inner portion 72b are stair-shaped step portions 72c extending in the circumferential direction with the axis L being the center. As shown in FIG. 7, each stair-shaped step portion 72c may be formed to define an arcuate cross section.

According to the second embodiment, in addition to the operation and effects of the first embodiment, the use of the bobbin less coil 39 can achieve the further operation and effects as follows. Not only the number of parts and the cost can be reduced by the elimination of a bobbin, but also the inner diameter of the coil 39 can be decreased by the elimination of the bobbin. Further, if the inner diameter of the coil 39 is decreased, the length of wire for securing the necessary number of windings can be shortened, and the resistance and inductance of the coil 39 are reduced, thereby increasing the electrical current response.

Although the embodiments of the present invention have been explained above, various changes in design can be made to the invention without departing from the subject matter of the present invention.

What is claimed is:

1. An active vibration isolation support system comprising:
    an actuator for reciprocatingly vibrating a movable core on an axis by energizing a coil cylindrically wound around a bobbin which is arranged around an outer periphery of a fixed core; and
    a fluid chamber which is arranged on the axis of the actuator, whose volume is changed by a load applied from outside, and whose internal pressure is controlled by being connected to the movable core,
    wherein an end surface of the coil on the fluid chamber side is inclined so that a radially outer side of the end surface is close to the fluid chamber with respect to the axis;
    wherein step portions extending in a circumferential direction with respect to the axis are formed on an inner surface of the bobbin, each step portion having an arcuate cross section and contacting the inclined end surface of the coil;
    wherein the actuator comprises a yoke having a cylindrical portion positioned at an inner periphery of the bobbin and a flange portion positioned to oppose an end face of the coil on the fluid chamber side; and
    wherein the bobbin has an upper inner flange which extends obliquely upward toward the fluid chamber, the inner surface being formed on the upper inner flange.

2. An active vibration isolation support system, comprising:
    an actuator for reciprocatingly vibrating a movable core on an axis by energizing a coil cylindrically wound around an outer periphery of a fixed core; and
    a fluid chamber which is arranged on the axis of the actuator, whose volume is changed by a load applied from outside, and whose internal pressure is controlled by being connected to the movable core,
    wherein an end surface of the coil on the fluid chamber side is inclined so that a radially outer side of the end surface is close to the fluid chamber with respect to the axis;
    wherein step portions extending in a circumferential direction with respect to the axis are formed on an inner surface of a plate, each step portion having an arcuate cross section and contacting the inclined end surface of the coil;
    wherein the actuator comprises a yoke having a cylindrical portion positioned at an inner periphery of the coil and a flange portion positioned to oppose an end face of the coil on the fluid chamber side; and
    wherein the plate is positioned on an upper surface of the coil, the plate having an inner portion which extends obliquely upward toward the fluid chamber, the inner surface being formed on the inner portion.

* * * * *